US012375128B2

(12) United States Patent
Moorthy et al.

(10) Patent No.: US 12,375,128 B2
(45) Date of Patent: Jul. 29, 2025

(54) ADJUSTMENT OF RADIO FREQUENCY SETTINGS OF NEAR-FIELD COMMUNICATION CIRCUITRY

(71) Applicant: Apple Inc., Cupertino, CA (US)

(72) Inventors: Vignesh Babu Moorthy, Santa Clara, CA (US); Rahul Narayan Singh, Sunnyvale, CA (US); Gordon Y. Scott, Cupertino, CA (US); Ho Cheung Chung, Sunnyvale, CA (US); Nischay Goel, San Jose, CA (US); Mahendra Bangalore, San Jose, CA (US); Nitin Byregowda, San Jose, CA (US); Vincent Chauvin, San Francisco, CA (US); Oren M. Elrad, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 396 days.

(21) Appl. No.: 17/950,454

(22) Filed: Sep. 22, 2022

(65) Prior Publication Data

US 2023/0108614 A1    Apr. 6, 2023

Related U.S. Application Data

(60) Provisional application No. 63/248,206, filed on Sep. 24, 2021.

(51) Int. Cl.
*H04B 5/48*    (2024.01)
*H04W 4/80*    (2018.01)
(Continued)

(52) U.S. Cl.
CPC ............... *H04B 5/48* (2024.01); *H04W 4/80* (2018.02); *H04W 8/005* (2013.01); *H04W 8/22* (2013.01)

(58) Field of Classification Search
CPC .......... H04B 5/48; H04W 4/80; H04W 8/005; H04W 8/22
See application file for complete search history.

(56) References Cited

U.S. PATENT DOCUMENTS

2013/0267169 A1* 10/2013 Hillan ............. H04B 5/20
455/41.1
2014/0370805 A1* 12/2014 Hillan ............. G06K 7/10237
455/41.1

(Continued)

FOREIGN PATENT DOCUMENTS

EP    3 667 933 A1    6/2020
JP    2001177435 A    6/2001

OTHER PUBLICATIONS

"International Search Report and Written Opinion," mailed Dec. 1, 2022 in International Application No. PCT/US2022/043222. 15 pages.

*Primary Examiner* — David Bilodeau
(74) *Attorney, Agent, or Firm* — Kilpatrick Townsend & Stockton LLP

(57) ABSTRACT

A user device including near-field communication (NFC) circuitry may receive a polling message from an NFC terminal. The user device may obtain information based at least in part on the polling message. The user device may determine a characteristic of the NFC terminal based at least in part on the information. The characteristic may be indicative of a radio frequency (RF) field strength of the NFC terminal. The user device may adjust an RF setting of the NFC circuitry based at least in part on the characteristic. The RF setting may correspond to an RF sensitivity of the NFC circuitry.

20 Claims, 6 Drawing Sheets

(51) Int. Cl.
*H04W 8/00* (2009.01)
*H04W 8/22* (2009.01)

(56) References Cited

U.S. PATENT DOCUMENTS

| | | | |
|---|---|---|---|
| 2015/0172934 A1* | 6/2015 | Engelien-Lopes | H04W 24/02 370/252 |
| 2016/0066131 A1* | 3/2016 | Royston | H04B 1/123 455/41.1 |
| 2016/0127857 A1* | 5/2016 | O'Donoghue | H04W 76/14 455/41.1 |
| 2016/0156386 A1* | 6/2016 | Van Nieuwenhuyze | H04W 4/80 455/41.1 |
| 2016/0353270 A1 | 12/2016 | Brisebois | |
| 2017/0055109 A1* | 2/2017 | Van Nieuwenhuyze | H04W 12/02 |
| 2021/0036726 A1* | 2/2021 | Muehlmann | H04B 5/20 |
| 2022/0078578 A1* | 3/2022 | Brumley | G01S 13/767 |
| 2022/0141772 A1* | 5/2022 | Muehlmann | H04W 4/80 370/318 |

* cited by examiner

ADJUSTMENT OF RADIO FREQUENCY SETTINGS OF NEAR-FIELD COMMUNICATION CIRCUITRY

CROSS-REFERENCES TO RELATED APPLICATIONS

This application claims priority under 35 U.S.C. § 119(e) to U.S. Provisional Application No. 63/248,206, filed on Sep. 24, 2021 entitled, "ADJUSTMENT OF RADIO FREQUENCY SETTINGS OF NEAR-FIELD COMMUNICATION CIRCUITRY," the contents of which are herein incorporated by reference.

BACKGROUND

Terminals that are used for near-field communication (NFC) transactions may be manufactured by different entities. Additionally, these terminals may be used to support various different types of transactions (loyalty, purchase, secure access, transit etc.). User devices such as smartphones and smartwatches may include NFC circuitry to communicate with these terminals. Considering the different manufacturers and different transaction types, operational properties of a first NFC terminal may vary considerably with respect to a second NFC terminal.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes receiving, at a user device including near field communication (NFC) circuitry, a polling message from an NFC terminal. The computer-implemented method also includes obtaining information based at least in part on the polling message. The computer-implemented method also includes determining a characteristic of the NFC terminal based at least in part on the information, the characteristic indicative of a radio frequency (RF) field strength of the NFC terminal. The computer-implemented method also includes adjusting an RF setting of the NFC circuitry based at least in part on the characteristic, the RF setting corresponding to an RF sensitivity of the NFC circuitry. Other embodiments of this aspect include corresponding computer systems, apparatus, and computer programs recorded on one or more computer storage devices, each configured to perform the actions of the methods.

DETAILED DESCRIPTION

Figure 1:
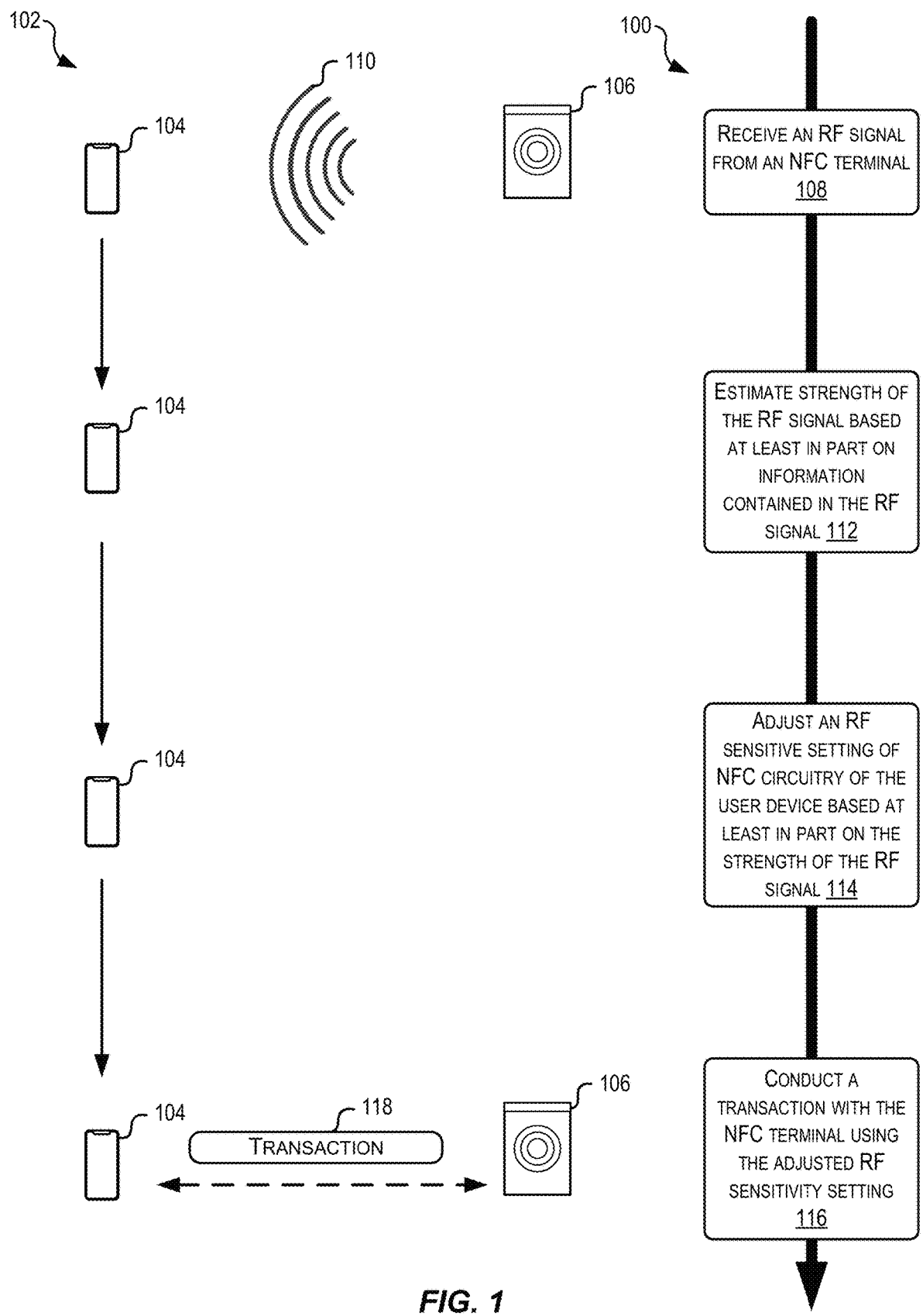
FIG. 1 illustrates a block diagram and a flowchart showing a process for adjusting RF settings of NFC circuitry of a user device, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable storage media relating to selectively adjusting radio-frequency (RF) settings of a user device based on one or more characteristics of a near-field communication (NFC) terminal. The adjusted RF settings may include changing an RF sensitivity of an NFC circuitry resident on the user device. The one or more characteristics of the NFC terminal may include a field strength of the NFC terminal. The adjusting may be performed by the user device in real-time as the NFC circuitry begins communicating with the NFC terminal. The value of the RF setting may be selected by the user device to achieve a target operating volume with respect to the particular field strength of the NFC terminal (e.g., a three-dimensional space around an NFC terminal in which the NFC circuitry can reliably communicate with the NFC terminal). This may result in a higher likelihood of successful transactions between NFC terminals and the user device, a lower likelihood of double charges on multiple NFC-enabled devices when performing authentication-less transactions, as described herein, and increased user satisfaction.

Considering the number of manufacturers of NFC terminals across the world and the different uses thereof (e.g., transit, secure access, payment, etc.), the RF field strength of these NFC terminals may vary dramatically from one terminal to the next. When the field strength of an NFC terminal is too strong, the distance at which an NFC circuitry on the user device will begin communicating with the NFC terminal may be large (e.g., 12-15 centimeters). This may result in a poor user experience because a user may not expect that a transaction will occur (or at least be initiated at such a distance). Similarly, when the field strength of an NFC terminal is weak, the distance is small. This may also result in a poor user experience because the user may be required to more precisely position the user device with respect to the NFC terminal in order for a transaction to occur. In some cases, a weak signal may even lead to inoperability issues, which may also lead to user frustration. In some examples, a distance of between 4 to 7 centimeters may be a minimum operating distance for most NFC terminals, and a distance of 10 centimeters may be a maximum operating distance for most NFC terminals. The techniques described herein adjust one or more properties of NFC circuitry of the user device such that the NFC circuitry can be used to exchange information with the NFC terminal within some standard range (e.g., between 4 and 10 centimeters). In some examples, the max range is more than 10 centimeters and may also be less than 10 centimeters.

In some examples, user devices may be configured to perform certain transactions at NFC terminals without requiring user authentication (e.g., no passcode entry, no biometric authentication, etc.). For example, a user device may be configured to store a credential for a transit card, which may enable the user device, in some configurations, to pay for transit fares without user authentication. NFC terminals with strong RF fields may cause additional complications for these types of authentication-less transactions. For example, when the user attempts to pay for a fare, but is carrying multiple devices each with a transit transaction credential (e.g., one of a mobile phone, one on a smart watch, and/or one embedded in a plastic transit card), a strong field strength NFC terminal may result in more than one fare being charged. Continuing with a particular example, assume that the user has a transit credential on their mobile phone and one on their smartwatch. If they attempt to pay a fare with their watch, a broadcast signal from the strong field strength NFC terminal may be received by the watch and the mobile phone (e.g., in the user's pocket), and each of these devices will operate as if it is the intended device. Because the terminal is unable to determine that these two devices are associated with the same user, the user's account may be debited for two fares (e.g., one from the watch and one from the phone). By reducing the sensitivity of the NFC circuitry on the phone, the effective range of the NFC terminal's signal with respect to the phone is also reduced, thereby making it less likely that the phone—located at a greater distance from the NFC terminal—and the watch—nearer the NFC terminal—will both perform transactions.

Turning now to a particular example, a user device is provided that includes circuitry to enable NFC transactions. As the user device approaches an NFC terminal, the circuitry may receive a signal from the NFC terminal. This circuitry may read the signal and identify information within the signal. Using this information, the circuitry may determine a characteristic of the field strength of the NFC terminal. For example, the characteristic may be indicative of high field strength or low field strength. The circuitry may use the characteristic to dynamically determine an appropriate RF sensitivity setting for the circuitry. For example, if the characteristic is indicative of high field strength, the RF sensitivity setting may be dynamically decreased (e.g., in a matter of milliseconds and while the NFC terminal and the circuitry are connected or in the process of connecting). This action will function to decrease an effective operating volume of the circuitry with respect to the NFC terminal, which is directly related to a reduced effective distance between the NFC terminal and the circuitry. If the characteristic is indicative of low field strength, the RF sensitivity setting may be increased. This action will function to increase the effective operating volume of the circuitry with respect to the NFC terminal. Once the RF sensitivity setting has been dynamically adjusted, the circuitry may conduct a transaction with the NFC terminal using conventional techniques. In some examples, the transaction may be performed without user authentication, in the background, e.g., in a manner that does not wake the user device from a sleep mode, and/or in any other suitable manner.

The methods, systems, devices, and computer-readable storage media described herein provide several technical advantages that improve the function of user devices that include NFC circuitry. For example, adjusting the RF sensitivity setting of NFC circuitry on-demand may result in the establishment of reliable RF links with even more NFC terminals than conventional approaches. The RF links may be more reliable because the adjusted RF sensitivity setting will result in an operating volume that is the generally consistent for all of the NFC terminals, irrespective of strength of the NFC circuitry.

Turning now to the figures, FIG. 1 illustrates a block diagram 102 and a flowchart showing a process 100 for adjusting RF settings of NFC circuitry of a user device 104, according to at least one example. The diagram 102 includes the user device 104 and an NFC terminal 106. The user device 104 may be operated by a user. Though, in some examples, the techniques described herein may be performed programmatically (e.g., without input from the user). The user device 104 may be any suitable electronic device capable of performing the techniques described herein. In some examples, the user device may be a handheld and/or portable user device such as a mobile phone, smartwatch, tablet, laptop, and the like. The NFC terminal 106 may be any suitable electronic device capable of performing the techniques described herein.

Figure 4:
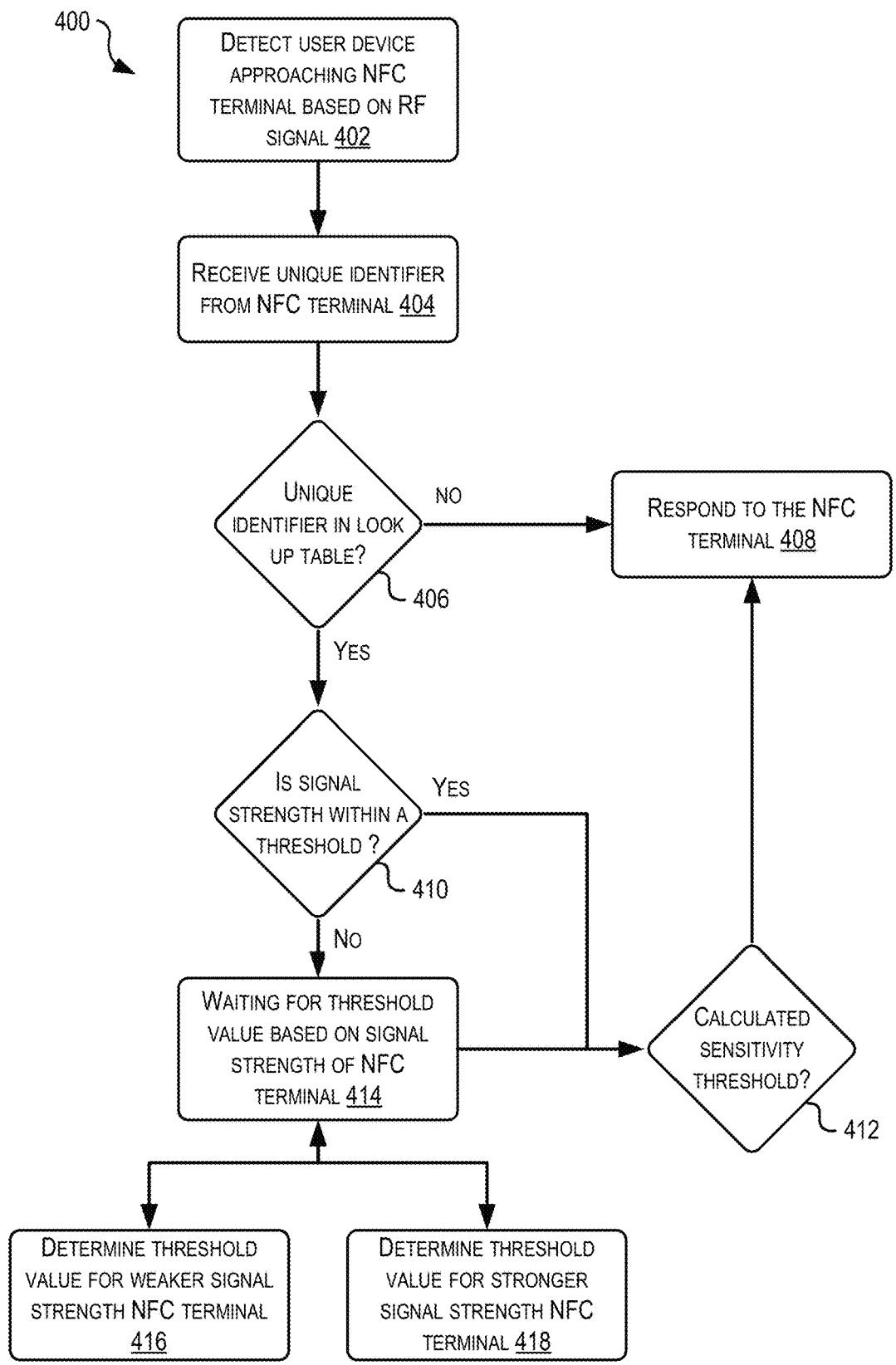
FIG. 4 illustrates a flowchart showing an example process for adjusting RF settings of NFC circuitry of a user device, according to at least one example.
Figure 5:
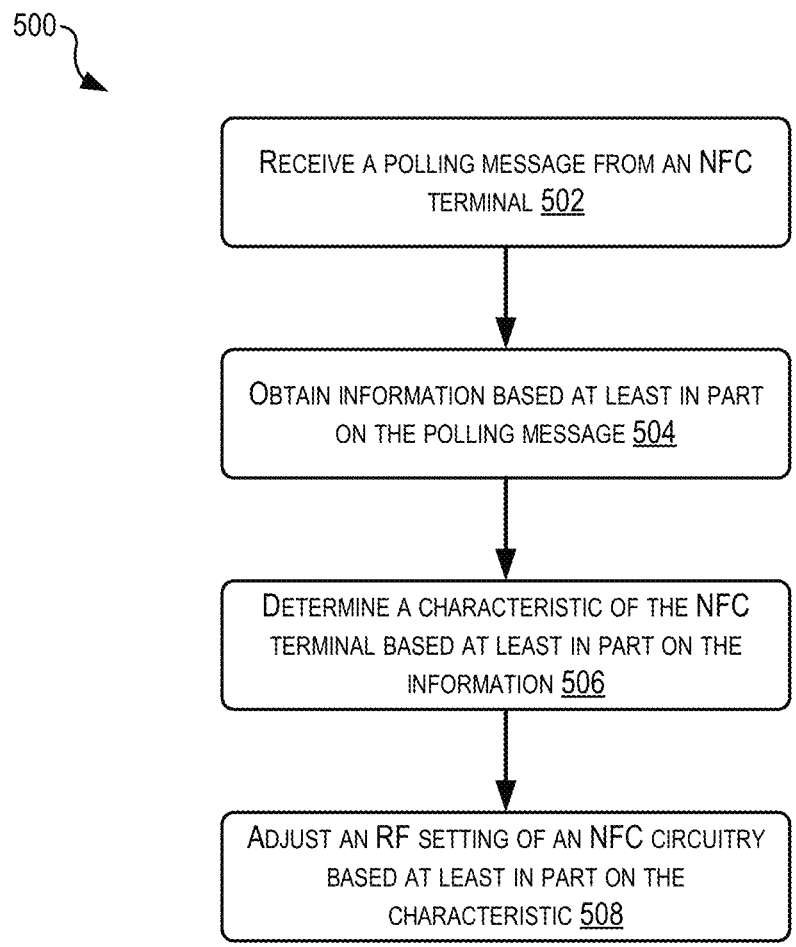
FIG. 5 illustrates a flowchart showing an example process for adjusting RF settings of NFC circuitry of a user device, according to at least one example.

FIGS. 1, 4, and 5 illustrate example flow diagrams showing processes 100, 400, and 500, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

The process 100 begins at 108 by the user device 104 receiving an RF signal 110 from the NFC terminal 106. The RF signal may be a polling message broadcast by the NFC terminal 106. The RF signal may be received by NFC circuitry of the user device 104.

At block 112, the process 100 includes the user device 104 estimating strength of the RF signal 110 based at least in part on information contained in the RF signal 110. For example, the RF signal 110 may include a field that includes a value that is indicative of the strength of the RF signal 110. The RF signal may alternatively (or additionally) include an identifier that can be used to identify general information about the NFC terminal 106. For example, the identifier may identify an entity that operates a transaction system that includes the NFC terminal 106, an identifier that identifies a type of the NFC terminal 106, etc. In this example, the identifier may be used by the user device 104 to lookup the information about the NFC terminal 106 from a table, database, or other data storage structure.

At block 114, the process 100 includes the user device 104 adjusting an RF sensitive setting of the NFC circuitry of the user device 104 based at least in part on the strength of the RF signal 110. For example, the estimated strength of the RF signal 110 determined at block 112 may be used to adjust the RF sensitivity setting of the NFC circuitry (e.g., increase sensitivity, decrease sensitivity, or leave the setting the same). This adjustment and the estimating at block 112 may be performed dynamically or otherwise on the fly. This is because the user device 104 may not know the characteristics of the RF signal 110 until it receives the polling message.

At block 116, the process 100 includes the user device 104 conducting a transaction 118 with the NFC terminal 106 using the adjusted RF sensitivity setting. This may include the user device 104 and the NFC terminal 106 exchanging information once an RF link has been established between the user device 104 and the NFC terminal 106. The transaction 118 may include a payment transaction, a fare transaction, an access transaction, etc. The transaction 118 may be performed using any suitable approach, which may or may not include user authentication.

Figure 2:
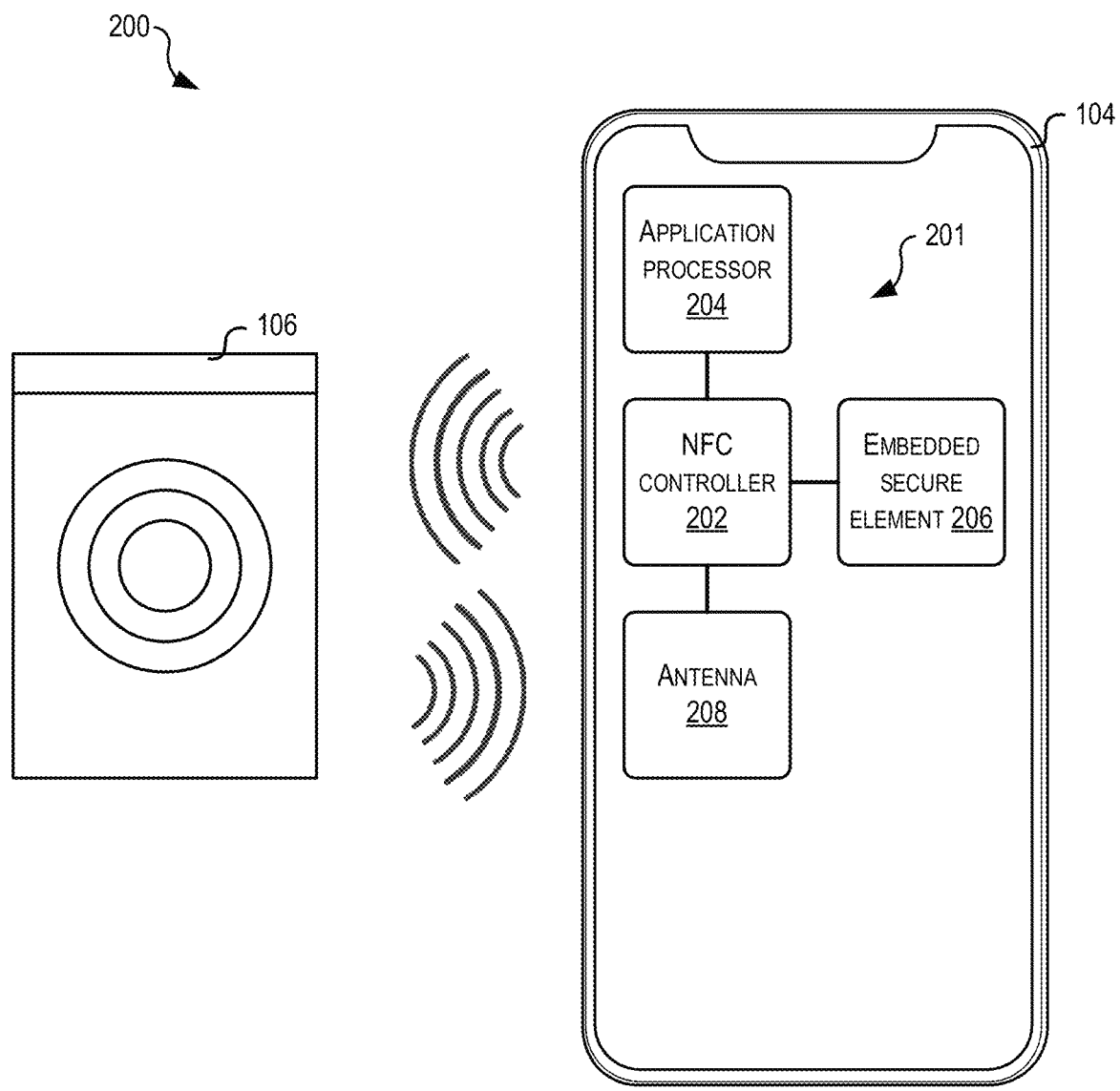
FIG. 2 illustrates a block diagram showing an example architecture or system for adjusting RF settings of NFC circuitry of a user device, according to at least one example.

FIG. 2 illustrates a block diagram showing an example architecture or system 200 for adjusting RF settings of NFC circuitry of a user device, according to at least one example. The system 200 includes the user device 104 and the NFC terminal 106 from FIG. 1. The user device 104 may including NFC circuitry 201 including, for example, an NFC controller 202, an application processor 204, an embedded secure element 206, and an antenna 208. In some examples, the illustrated components of the NFC circuitry 201 may be included on a single chip, combined into multiple chips, and/or provided as independent components.

The NFC circuitry 201 may be configured to perform the techniques described herein. The NFC circuitry 201 may be configured differently, depending on the embodiment. For example, the NFC controller 202 may include an onboard processor (e.g., a controller) for determining RF settings for the NFC controller 202 and implementing those settings, and may include a memory for storing an entity table that may be accessed by the onboard processor when determining the RF settings. The NFC controller 202 may support the various protocols and standards described herein (e.g., ISO14443A, ISO14443B, ISO7816, etc.). In some examples, the NFC controller 202 may be configured to route payloads to each component of the NFC circuitry 201.

As an additional example, the application processor 204 may be configured specifically to perform operations relating to the NFC circuitry. In some examples, the application processor 204 may be configured to perform operations relating to the NFC circuitry and other operations relating to the user device 104 more generally. These other operations may include receiving and providing user input and user output, providing user interfaces, communicating with service providers, authenticating a user, etc. In some examples, the application processor 204 may include a near-field communication interface (NCI), a universal asynchronous receiver-transmitter (UART), system power management interface protocol (SPMI Protocol), inter-integrated circuit (i2C) protocol, support for the transport layer, and middleware applications.

The embedded secure element 206 may generally be configured for secure access control of certain sensitive operations. For example, the embedded secure element 206 may include memory to store sensitive information relating to conducting transactions using the NFC circuitry 201, such as credentials, card numbers, identifying information, and other information relating to transaction instruments (e.g., payment cards, transit cards, driver license, identification cards, passports, secure access cards, etc.). Thus, in some examples, the embedded secure element 206 may be used to perform transactions such as payment transactions, transit card access, secure location access, identification transactions, and the like. The embedded secure element 206 may also include an onboard processor for performing certain secure operations. These operations may include certain cryptographic operations and the like that are performed when the NFC circuitry 201 is used to conduct a transaction. In some examples, the memory of the embedded secure element 206 may also be used to store the entity table or other data structure relating to the techniques described herein. The embedded secure element 206 may include, among other things, a host control interface (HCI), parameters for controlling RF communication used by an NFC controller, and capability for recording transaction metrics (e.g., total transaction time, start/end of transaction, etc.).

The antenna 208 may be configured to transmit and receive RF signals from the NFC terminal 106. The antenna 208 may take the form of a loop and/or may take any other form. In some examples, the NFC terminal 106 may also include an antenna. The antenna of the NFC terminal 106 and the antenna 208 may use inductive coupling to form an air-core transformer over which RF signals are passed. The antenna of the 208 may include Rx sensitivity adjustment (e.g., adjust receiver sensitivity), Tx power adjustment (e.g., adjust transmission power), RF modulation of Type A, Type B, and Type F messages, radio frequency timeout handling, and collision handling.

The NFC circuitry 201 may be configured to support communications over various communication protocols and data exchange formats. Example standards may be based on ISO/IEC 14443, which may include NFC Type A and Type B standards, ISO/IEC 18092 (NFCIP-1) and ISO/IEC 21481 (NFCIP-2), which may be related to FeliCa standards. In some examples, the NFC circuitry 201 may be configured to use the NFC Data Exchange Format (NDEF), Simple NDEF Exchange Protocol (SNEP), or any other suitable format to store and transport information.

Figure 3:
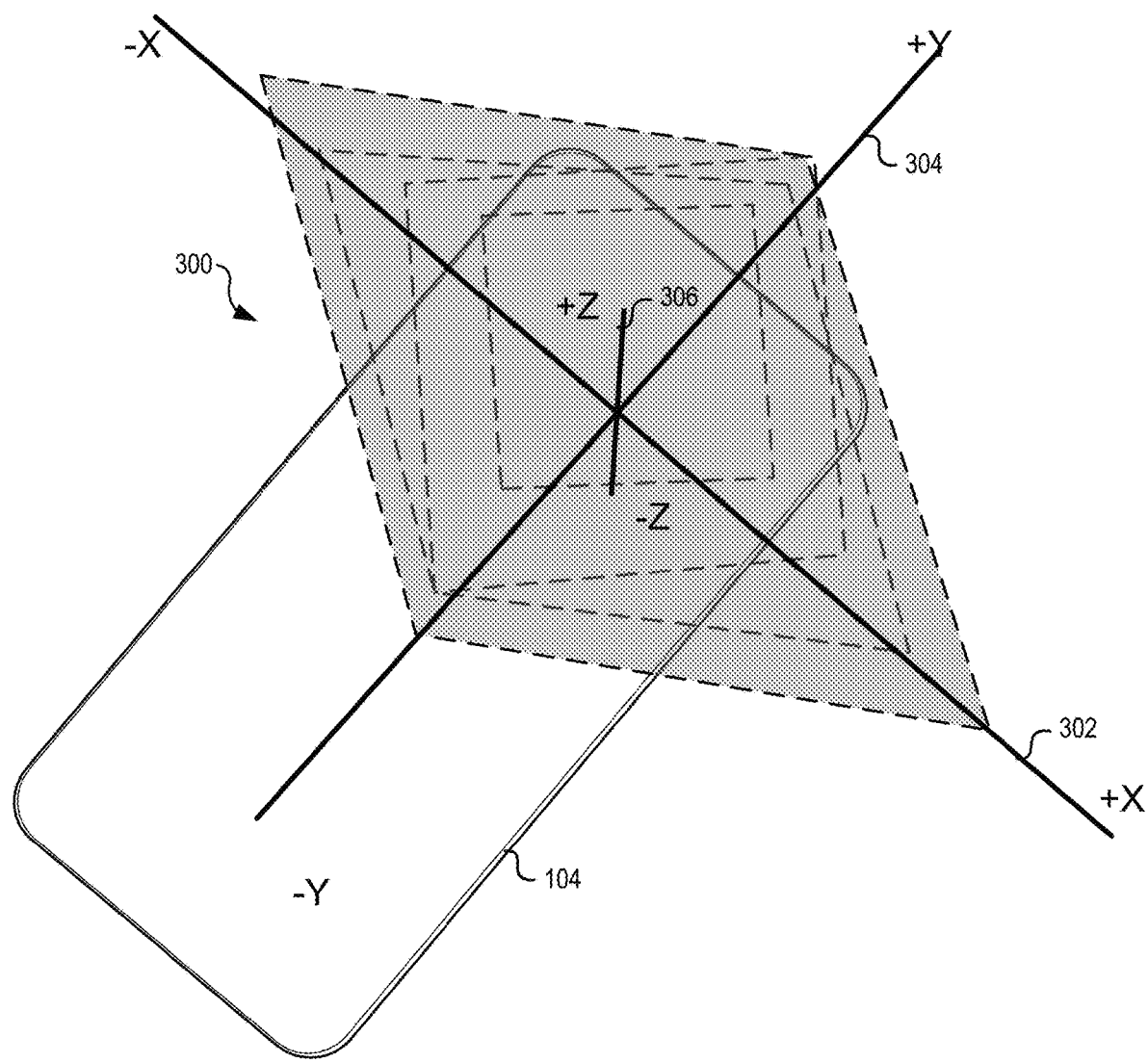
FIG. 3 illustrates a diagram depicting a target operating volume relating to adjusting RF settings of NFC circuitry of a user device, according to at least one example.

FIG. 3 illustrates a diagram depicting a target operating volume 300 relating to adjusting RF settings of NFC circuitry of the user device 104, according to at least one example. Generally, an operating volume may a define a three-dimensional space in which the user device 104 may be placed with respect to an NFC terminal. The target operating volume 300 may define a volume that is desirable in order to provide a high likelihood of successful transactions and a good user experience. As described herein, because the user device 104 cannot be used to adjust operational properties of the NFC terminal, the user device 104 may adjust its own setting(s) to provide an operating volume that is similar to the target operating volume 300.

The target operating volume 300 may be defined with respect to a three-dimensional space, having an X axis 302, an Y axis 304, and a Z axis 306. (X, Y, and Z axes). The target operating volume 300 may be defined at a set of example heights (Z values), which generally represent a normal distance between the NFC terminal and the user device 104. In Table 1 below, a set of Z values of 1, 2, 3, and 4 are provided. For each of the Z values, the table also provides example X coordinates and Y coordinates. As shown in Table 1 and illustrated in FIG. 3, when the user device 104 is nearer the NFC terminal (e.g., smaller Z values), the area in which the user device 104 may be moved (at the defined Z plane) is larger than when the user device 104 is further from the NFC terminal (e.g., larger Z values). Within the target operating volume 300, the RF setting of the user device 104 may between 250 and 750 microamperes per meter.

TABLE 1

| Z (cm) | X (cm) | Y (cm) |
|---|---|---|
| 1 | [−5, 5] | [−3, 3] |
| 2 | [−4, 4] | [−3, 3] |
| 3 | [−3, 3] | [−3, 3] |
| 4 | [−2, 2] | [−2, 2] |

FIG. 4 illustrates a flowchart showing an example process 400 for adjusting RF settings of NFC circuitry of a user device, according to at least one example. The process 400 may be performed by the user device 104 (FIG. 1) including the NFC circuitry 201 (FIG. 2). In particular, the process 400 may be performed by components of the NFC circuitry 201 interacting with each other and with the NFC terminal.

The process 400 begins at block 402 by detecting a user device approaching an NFC terminal based at least in part on an RF signal. For example, this may include the NFC terminal outputting an RF field including the RF signal that is detected and received by the antenna 208 (FIG. 2). This detecting may trigger a set of operations to be performed by the NFC circuitry 201, including the specific process 400.

At block 404, the process 400 includes receiving a unique identifier from the NFC terminal. In some examples, this may include the antenna 208 receiving the unique identifier within an RF signal from the NFC terminal, and the NFC controller 202 (FIG. 2) identifying the unique identifier from the RF signal. The unique identifier may uniquely identify the NFC terminal, a type of the NFC terminal, and/or other information that may be used to identify properties of the NFC terminal, as described herein.

At block 406, the process 400 includes determining whether the unique identifier can be found in a look up table. In some examples, this may be performed by the NFC controller 202 and/or the embedded secure element 206 (FIG. 2). For example, this may include the NFC controller 202 accessing the look up table (e.g., an entity table) stored by the embedded secure element 206 to determine whether the unique identifier is found in the table. In some examples, the unique identifier may be used as a key to the look up table. If the unique identifier is not found in the look up table, the process 400 includes responding to the NFC terminal at block 408. This may be performed by the antenna 208 communicating with the NFC terminal. In some examples, this may include proceeding with establishing the link with the NFC terminal without adjusting the RF sensitivity of the NFC circuitry 201.

If the unique identifier is found in the look up table, the process 400 proceeds to block 410, which includes determining whether signal strength (e.g., received signal strength indicator (RSSI)) associated with the identifier is within a first threshold (e.g., a threshold relating to strength of the signal). This may be performed by the NFC controller 202 and/or the secure element 206. The first threshold may be defined with respect to a range of strength values, and being within the first threshold may include being within the range of strength values and being not within the first threshold may include being outside the range.

If the signal strength is within the threshold, the process 400 proceeds to block 412, which includes determining whether a sensitivity threshold is calculated (e.g., a second threshold relating to sensitivity of the NFC circuitry 201). Block 412 may be performed by the NFC controller 202 and/or the secure element 206. If yes at block 412, the process 400 proceeds to block 408 and responds to the NFC terminal to proceed. For example, if the received signal strength is appropriate for the current RF sensitivity of the NFC circuitry 201, the process 400 may proceed without adjusting the RF sensitivity.

If the signal strength is not within the threshold, the process 400 proceeds to block 414, which includes waiting for threshold value based on signal strength of NFC terminal. This may be performed by the NFC controller 202 and/or the secure element 206. In some examples, this may include computing the sensitivity threshold value. This sensitivity threshold in block 412 may relate to a threshold RF sensitivity value of the antenna 208. If this value can be calculated based on information about the NFC terminal and/or the RF signals being emitted by the NFC terminal.

At block 416, the process 400 includes determining the threshold value for weaker signal strength NFC terminal. This may be performed by the NFC controller 202 and/or the secure element 206. This may include accessing the threshold value from memory of the NFC circuitry 201, determining it from the look up table, or resolving it in any other manner. For example, if the NFC signal received previously indicates that the NFC terminal is emitting a weaker signal, then this threshold value may relate to an increased RF sensitivity value of the antenna 208.

At block 418, the process 400 includes determining threshold value for stronger signal strength NFC terminal. This may be performed similarly as block 416, except that the threshold value for a stronger signal strength NFC terminal will include decreased RF sensitivity value of the antenna 208.

FIG. 5 illustrates a flowchart showing an example process 500 for adjusting RF settings of NFC circuitry of a user device, according to at least one example. The process 500 may be performed by the user device 104 (FIG. 1) including the NFC circuitry 201 (FIG. 2). In particular, the process 500 may be performed by a processor of the user device 104 that is separate from the NFC circuitry 201 or a processor that is included in the NFC circuitry 201. In some examples, performing the process 500 using the NFC circuitry 201 may enable the process to be performed in a manner that does not require the user device 104 to wake up from a sleep state. This may be because the processing occurs using hardware components of the NFC circuitry 201 and/or firmware embedded on the hardware components of the NFC circuitry 201.

The process 500 begins at block 502 by the NFC circuitry 201 receiving a polling message from an NFC terminal. The NFC circuitry 201 may be included in the user device 104. The polling message may be included in a broadcast signal from the NFC terminal. This polling message may be included in an RF signal provided via a broadcast or other suitable approach from the NFC terminal. The polling message may be sent as a part of a protocol or communication standard to initiate contact with the NFC circuitry 201 and other NFC circuitry embedded in other form factors (e.g., cards, fobs, other user devices, etc.). The polling message therefore may include at least some information about the NFC terminal. Generally, this information may be used by the NFC circuitry 201 to establish a stable RF link between with the NFC terminal, share information, and, in some examples, conduct a transaction. In some examples, the polling message may include one or more frames. The format of the polling message and/or the one or more frames may dependent, at least in part, on the type of transaction that will be performed by the NFC terminal and/or the type of terminal. For example, NFC terminals for transit transactions may include a transit specific polling message, NFC terminals for customer loyalties may include a loyalty specific polling message, NFC terminals for access may include an access specific polling message, and NFC terminals for payment transactions may include a payment specific polling message. In some examples, when the same NFC terminal supports multiple types of transactions, the polling message may include the formatting for the supported transactions and/or the NFC terminal may broadcast more than one type of polling message, e.g., simultaneously or at some fixed rate.

At block 504, the process 500 includes the NFC circuitry 201 obtaining information based at least in part on the polling message. The information may be included in the polling message, accessed from a data structure using information from the polling message, and in other suitable manners. As an example, a frame of a transit specific message may include a format field, a terminal information field, a terminal type field, an identifier field, a strength field, a scheme field, and any other suitable field. The identifier field, as described herein, may include an identifier (e.g., any suitable combination of characters) that may be used to lookup RF signal strength information for the NFC terminal. For example, the identifier may be used a lookup key to access an entity table that associates identifiers (e.g., NFC terminals) with RF signal strength information (e.g., average field strength, relative field strength, etc.). In some examples, the identifier may be used by the user device as a lookup key to access a table of operator entities. For example, the identifier may map to an identifier of a transit authority that includes a system of NFC terminals including the type of the particular NFC terminal from which the polling message was received. Using the same or a different table, the identifier of the transit authority may be used by the user device to identify the type of NFC terminals used by the transit authority and their relative strength. For example, a first type of NFC terminal may generally output a high strength RF field, while another type may generally output a weak strength RF field.

The strength field may include one or more values that may be indicative of the strength of the field output by the NFC terminal. For example, a value of "1" may indicate a high strength RF field, a value of "0" may indicate a low strength RF field, and a null value may indicate a normal strength RF field.

At block 506, the process 500 includes the NFC circuitry 201 determining a characteristic of the NFC terminal based at least in part on the information. The characteristic may be indicative of a radio frequency (RF) field strength of the NFC terminal. For example, as described with respect to block 504, the NFC circuitry 201 may determine the RF field strength using the information, e.g., directly from the information, as a key for accessing a lookup table, etc.

In some examples, block 504 may include obtaining the information by reading the information from one or more fields in the polling message. In some examples, the one or more fields may identify at least one bit value. In this example, determining the characteristic at block 506 may include determining that the at least one bit value indicates at least one of a high field strength of the NFC terminal, a normal field strength of the NFC terminal, or a low field strength of the NFC terminal.

At block 508, the process 500 includes the NFC circuitry 201 adjusting an RF setting of the NFC circuitry 201 based at least in part on the characteristic. The RF setting may correspond to an RF sensitivity of the NFC circuitry 201. For example, when the field strength is high, the sensitivity may be adjusted down. When the field strength is low, the sensitivity may be adjusted up. In some examples, adjusting the RF setting of the NFC circuitry 201 may increase or decrease an operating volume of the NFC chip, as shown in FIG. 3. In some examples, adjusting the RF setting of the NFC circuitry occurs while a stable link (e.g., an inductive coupling by which information can be passed between the devices) is established with the NFC terminal. In some examples, the stable link may be established once the NFC circuitry 201 receives the polling message (e.g., at block 502). In some examples, adjusting the RF setting of the NFC circuitry 201 may include at least one of increasing the RF sensitivity of the NFC circuitry within a high target RF sensitivity range or decreasing the RF sensitivity of the NFC circuitry to within a low target RF sensitivity range. The target RF ranges may be predefined values, which may be accessed by the NFC circuitry 201 when adjusting at block 508. In some examples, the high target RF sensitivity range may range between 500 and 750 milliampere per meter. In some examples, the low target RF sensitivity range may be between 250 and 500 milliampere per meter.

In some examples, the process 500 may further include, after adjusting the RF setting of the NFC circuitry, using the NFC circuitry 201 to conduct a transaction with the NFC terminal at the adjusted RF setting. The transaction may include a transit transaction to gain access to transit resources, a loyalty transaction to gain access to loyalty resources and/or record loyalty benefits, a financial transaction to pay for goods or services, an access transaction to obtain access to a secured environment, etc. In some examples, conducting the transaction with the NFC terminal may include conducting the transaction without requiring user authentication at the user device. For example, not only may the transaction be "contact-less," but it also may be authentication-less. This may include the NFC terminal and the NFC circuitry conducting a transaction in a manner that does not require the user device to prompt the user for authentication (e.g., biometric authentication, passcode authentication, etc.). In some examples, this type of transaction may occur as a background process without waking up the user device from a sleep mode. This may enable transactions to be quickly and easily conducted transactions in an efficient and streamlined manner. Additionally, conducing transactions in this manner, may conserve computing resources and therefore battery life because the transaction may be conducted without the user device having to spin up other processors, turn on a display, interact with a user, etc. By not requiring all of these additional processes, battery on the user device may be preserved.

In some examples, the process 500 may include receive characterizing information from a different user device that is associated with the user device. In this example, determining the characteristic of the NFC terminal at block 506 may further be based at least in part on the characterizing information. The characterizing information may include information about the NFC terminal and/or information about the different user device. For example, the different user device and the user device may both be located adjacent the NFC terminal, and the characterizing information from the different user device may indicate that the different user device has (or is planning to) conduct a transaction of a particular type with the NFC terminal. This may be used by the user device to decide not to conduct an additional transaction. The characterizing information may also include the same or similar information as was received in the polling message. In this manner, the user device may use the characterizing information to validate the determined characteristic. In this particular example, the user device may be a smartphone or a smartwatch that are paired together (e.g., via a Bluetooth connection) and the different user device may the other of the smartphone or the smartwatch.

Figure 6:
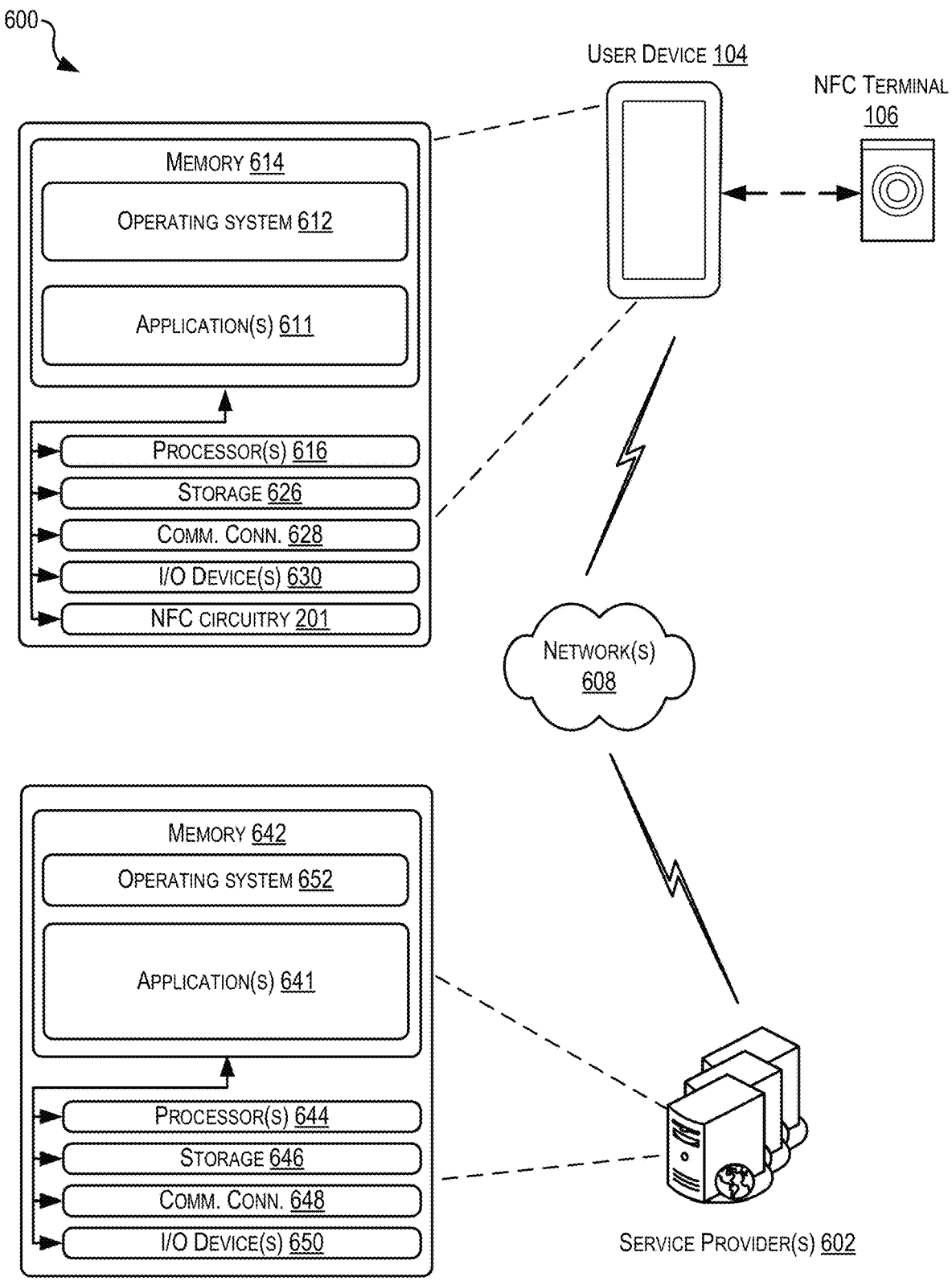
FIG. 6 illustrates a simplified block diagram depicting an example architecture for implementing the techniques described herein, according to at least one example.

FIG. 6 illustrates an example architecture or environment 600 configured to implement techniques described herein, according to at least one example. In some examples, the example architecture 600 may further be configured to enable a user device 104 and service provider computer 602 to share information, and the user device 104 and the NFC terminal 106 to share information. In some examples, the user device 104 and the service provider computer 602 may be connected via one or more networks 608 (e.g., via Bluetooth, WiFi, the Internet, or the like). In some examples, the service provider computer 602 may be configured to implement at least some of the techniques described herein with reference to the user device 104. The NFC terminal 106 and the user device 104 may be connected using any suitable RF connection, which may be low energy and require proximity.

In some examples, the networks 608 may include any one or a combination of many different types of networks, such as cable networks, the Internet, wireless networks, cellular networks, satellite networks, other private and/or public networks, or any combination thereof. While the illustrated example represents the user device 104 accessing the service provider computer 602 via the networks 608, the described techniques may equally apply in instances where the user device 104 interacts with the service provider computer 602 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer configurations, etc.).

As noted above, the user device 104 may be any type of computing device such as, but not limited to, a mobile phone, a smartphone, a personal digital assistant (PDA), a laptop computer, a desktop computer, a thin-client device, a tablet computer, a wearable device such as a smart watch, or the like. In some examples, the user device 104 may be in communication with the service provider computer 602 via the network 608, or via other network connections.

In one illustrative configuration, the user device 104 may include at least one memory 614 and one or more processing units (or processor(s)) 616. The processor(s) 616 may be implemented as appropriate in hardware, computer-executable instructions, firmware, or combinations thereof. Computer-executable instruction or firmware implementations of the processor(s) 616 may include computer-executable or machine-executable instructions written in any suitable programming language to perform the various functions described. The user device 104 may also include geo-location devices (e.g., a global positioning system (GPS) device or the like) for providing and/or recording geographic location information associated with the user device 104.

The memory 614 may store program instructions that are loadable and executable on the processor(s) 616, as well as data generated during the execution of these programs. Depending on the configuration and type of the user device 104, the memory 614 may be volatile (such as random access memory (RAM)) and/or non-volatile (such as read-only memory (ROM), flash memory, etc.). The user device 104 may also include additional removable storage and/or non-removable storage 626 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 614 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 614 and the additional storage 626, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 614 and the additional storage 626 are both examples of non-transitory computer storage media. Additional types of computer storage media that may be present in the user device 104 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 104. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 104 may also contain communications connection(s) 628 that allow the user device 104 to communicate with a data store, another computing device or server, user terminals, and/or other devices via the network 608. The user device 104 may also include I/O device(s) 630, such as a keyboard, a mouse, a pen, a voice input device, a touch screen input device, a display, speakers, a printer, etc. The user device may also include the NFC circuitry 201, as described elsewhere herein.

Turning to the contents of the memory 614 in more detail, the memory 614 may include an operating system 612 and/or one or more application programs or services for implementing the features disclosed herein such as applications 611 (e.g., a digital wallet, third-party applications, browser application, etc.). For example, a digital wallet application may be implemented, at least in part, by the NFC circuitry 201. The digital wallet application may be used to store information associated with NFC transactions, which may include, for example, information for digital payment instruments and other types of cards (e.g., transit, loyalty, rewards, access, etc.). Examples of such information may include a credential associated with each respective card. The credential may be used to conduct a transaction with the NFC terminal 106. This may include sharing the credential, using the credential to sign messages, generating information based on the credential, and the like. In some examples, at least some portion of provisioning the credentials on the user device 104 may be performed by interacting with the service provider computer 602.

The service provider computer 602 may also be any type of computing device such as, but not limited to, a collection of virtual or "cloud" computing resources, a remote server, a mobile phone, a smartphone, a PDA, a laptop computer, a desktop computer, a thin-client device, a tablet computer, a wearable device, a server computer, a virtual machine instance, etc. In some examples, the service provider computer 602 may be in communication with the user device 104 via the network 608, or via other network connections.

In one illustrative configuration, the service provider computer 602 may include at least one memory 642 and one or more processing units (or processor(s)) 644. The processor(s) 644 may be implemented as appropriate in hardware, computer-executable instructions, firmware, or combinations thereof. Computer-executable instruction or firmware implementations of the processor(s) 644 may include computer-executable or machine-executable instructions written in any suitable programming language to perform the various functions described.

The memory 642 may store program instructions that are loadable and executable on the processor(s) 644, as well as data generated during the execution of these programs. Depending on the configuration and type of service provider computer 602, the memory 642 may be volatile (such as RAM) and/or non-volatile (such as ROM, flash memory, etc.). The service provider computer 602 may also include additional removable storage and/or non-removable storage 646 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 642 may include multiple different types of memory, such as SRAM, DRAM, or ROM. While the volatile memory described herein may be referred to as RAM, any volatile memory that would not maintain data stored therein, once unplugged from a host and/or power, would be appropriate. The memory 642 and the additional storage 646, both removable and non-removable, are both additional examples of non-transitory computer-readable storage media.

The service provider computer 602 may also contain communications connection(s) 648 that allow the service provider computer 602 to communicate with a data store, another computing device or server, user terminals and/or other devices via the network 608. The service provider computer 602 may also include I/O device(s) 650, such as a keyboard, a mouse, a pen, a voice input device, a touch input device, a display, speakers, a printer, etc.

Turning to the contents of the memory 642 in more detail, the memory 642 may include an operating system 652 and/or one or more application programs or services for implementing the features disclosed herein.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In examples utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate examples may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology may include storing data relating to a user's NFC transaction habits. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter ID's, home addresses, numbers of identification instruments, date of birth, health record data, or any other identifying or personal or health information.

The present disclosure recognizes that the use of such personal information data, in the present technology, can be used to the benefit of users. For example, the personal information data can be used to provide enhancements to a user's spending habits. Further, other uses for personal information data that benefit the user are also contemplated by the present disclosure. For instance, such data may be used to provide insights into a user's general transaction history, or may be used as positive feedback to individuals using technology to pursue similar goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer-implemented method, comprising:
   receiving, at a user device including near field communication (NFC) circuitry, a polling message from an NFC terminal;
   obtaining information based at least in part on the polling message;
   determining a characteristic of the NFC terminal based at least in part on the information, the characteristic indicative of a radio frequency (RF) field strength of the NFC terminal; and
   adjusting an RF setting of the NFC circuitry based at least in part on the characteristic, the RF setting corresponding to an RF sensitivity of the NFC circuitry.

2. The computer-implemented method of claim 1, wherein obtaining the information comprises reading the information from one or more fields in the polling message.

3. The computer-implemented method of claim 2, wherein the one or more fields identify at least one bit value, and wherein determining the characteristic comprises determining that the at least one bit value indicates at least one of a high field strength of the NFC terminal, a normal field strength of the NFC terminal, or a low field strength of the NFC terminal.

4. The computer-implemented method of claim 1, wherein the information comprises an identifier associated with the NFC terminal.

5. The computer-implemented method of claim 4, wherein determining the characteristic comprises using the identifier to access a table that associates the identifier with the characteristic.

6. The computer-implemented method of claim 5, wherein the table associates a plurality of other identifiers associated with a plurality of other NFC terminals with a plurality of other characteristics of the plurality of other NFC terminals.

7. The computer-implemented method of claim 1, wherein adjusting the RF setting of the NFC circuitry comprises increasing or decreasing the RF sensitivity setting of the NFC circuitry.

8. A non-transitory computer-readable media comprising computer-executable instructions that, when executed by a processor of a user device, causes the user device to perform operations comprising:
   receiving a polling message from a near-field communication (NFC) terminal;
   obtaining information based at least in part on the polling message;
   determining a characteristic of the NFC terminal based at least in part on the information, the characteristic indicative of a radio frequency (RF) field strength of the NFC terminal; and
   adjusting an RF setting of NFC circuitry of the user device based at least in part on the characteristic, the RF setting corresponding to an RF sensitivity of the NFC circuitry.

9. The non-transitory computer-readable media of claim 8, wherein adjusting the RF setting of the NFC circuitry increases or decreases an operating volume of the NFC circuitry.

10. The non-transitory computer-readable media of claim 8, wherein the polling message is included in a broadcast signal from the NFC terminal.

11. The non-transitory computer-readable media of claim 8, wherein the information is included in a frame of the polling message.

12. The non-transitory computer-readable media of claim 8, wherein adjusting the RF setting of the NFC circuitry occurs while a stable link is established with the NFC terminal.

13. The non-transitory computer-readable media of claim 8, wherein adjusting the RF setting of the NFC circuitry comprises at least one of increasing the RF sensitivity of the NFC circuitry within a high target RF sensitivity range or decreasing the RF sensitivity of the NFC circuitry to within a low target RF sensitivity range.

14. The non-transitory computer-readable media of claim 13, wherein the high target RF sensitivity range comprises between 500 and 750 milliampere per meter and the low target RF sensitivity range comprises between 250 and 500 milliampere per meter.

15. The non-transitory computer-readable media of claim 8, further comprising additional computer-executable instructions that, when executed by the processor of the user device, cause the user device to perform additional operations comprising, after adjusting the RF setting of the NFC circuitry, using the NFC circuitry to conduct a transaction with the NFC terminal at the adjusted RF setting.

16. The non-transitory computer-readable media of claim 15, wherein conducting the transaction with the NFC terminal comprises conducting the transaction without requiring user authentication at the user device.

17. A user device, comprising:
near-field communication (NFC) circuitry; and
a processor communicatively coupled with the NFC circuitry and configured to at least:
receive, at the NFC circuitry, a polling message from an NFC terminal;
obtain information based at least in part on the polling message;
determine a characteristic of the NFC terminal based at least in part on the information, the characteristic indicative of a radio frequency (RF) field strength of the NFC terminal; and
adjust an RF setting of the NFC circuitry based at least in part on the characteristic, the RF setting corresponding to an RF sensitivity of the NFC circuitry.

18. The user device of claim 17, wherein the processor is further configured to at least receive characterizing information from a different user device that is associated with the user device, and wherein determining the characteristic of the NFC terminal is further based at least in part on the characterizing information.

19. The user device of claim 17, wherein the NFC circuitry comprises an embedded secure element configured to store an entity table.

20. The user device of claim 19, wherein the information comprises an identifier associated with the NFC terminal, and wherein determining the characteristic comprises using the identifier to access the entity table that associates the identifier with the characteristic.

* * * * *